United States Patent [19]

Tobisu

[11] 4,052,289

[45] Oct. 4, 1977

[54] APPARATUS FOR ELECTROSTATICALLY PURIFYING NON-CONDUCTIVE LIQUID

[76] Inventor: Torao Tobisu, 9-5, Chuo 1-chome, Ota, Tokyo, Japan

[21] Appl. No.: 700,123

[22] Filed: June 28, 1976

[51] Int. Cl.² .......................... B03C 5/02; B01D 17/06
[52] U.S. Cl. ..................................... 204/302; 204/306
[58] Field of Search .............................. 204/186–191, 204/302–308

[56] References Cited

U.S. PATENT DOCUMENTS

| 3,324,026 | 6/1967 | Waterman et al. | 204/302 |
| 3,398,082 | 8/1968 | Lochmann et al. | 204/302 |
| 3,980,541 | 9/1976 | Aine | 204/186 |

*Primary Examiner*—John H. Mack
*Assistant Examiner*—Aaron Weisstuch
*Attorney, Agent, or Firm*—Oblon, Fisher, Spivak, McClelland & Maier

[57] ABSTRACT

An apparatus for electrostatically purifying non-conductive liquids is disclosed and includes a tank; anode and cathode plates disposed in an interleaved opposed relationship within the tank; a conduit for introducing liquid to be treated into the tank, the conduit being disposed between lower edges of the electrode plates and having apertures at the upper surface thereof for dispersing liquid between the electrodes; a plurality of particle collecting members made of porous dielectric fiber disposed between the electrode plates so as to be in parallel with the direction of the electric field created by the electrode plates and the flow of liquid spurted from the conduit thereby defining a particle precipitation space between the conduit and the bottom of the tank; a liquid supply pipe communicating with the liquid conduit; a liquid outlet pipe for removing the treated liquid from the upper part of the tank to the exterior; and a drainage pipe for discharging the liquid remaining in the particle precipitation space.

6 Claims, 16 Drawing Figures

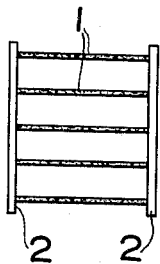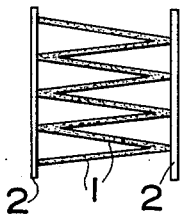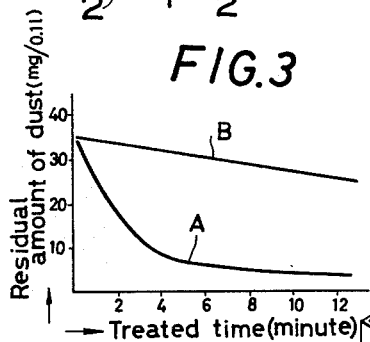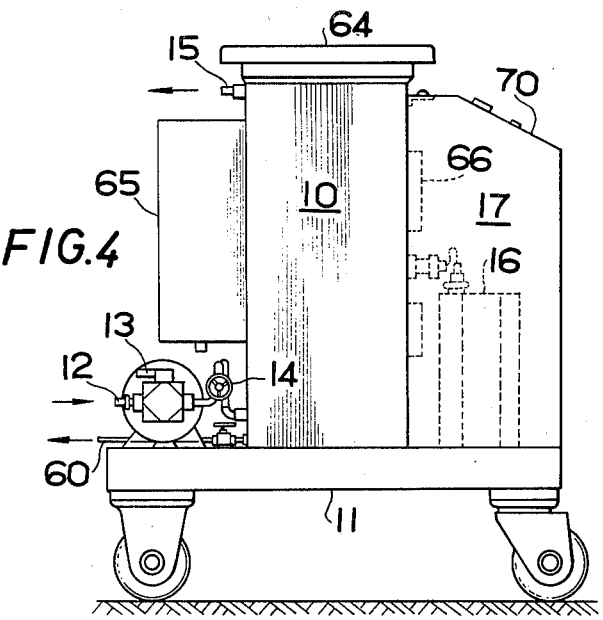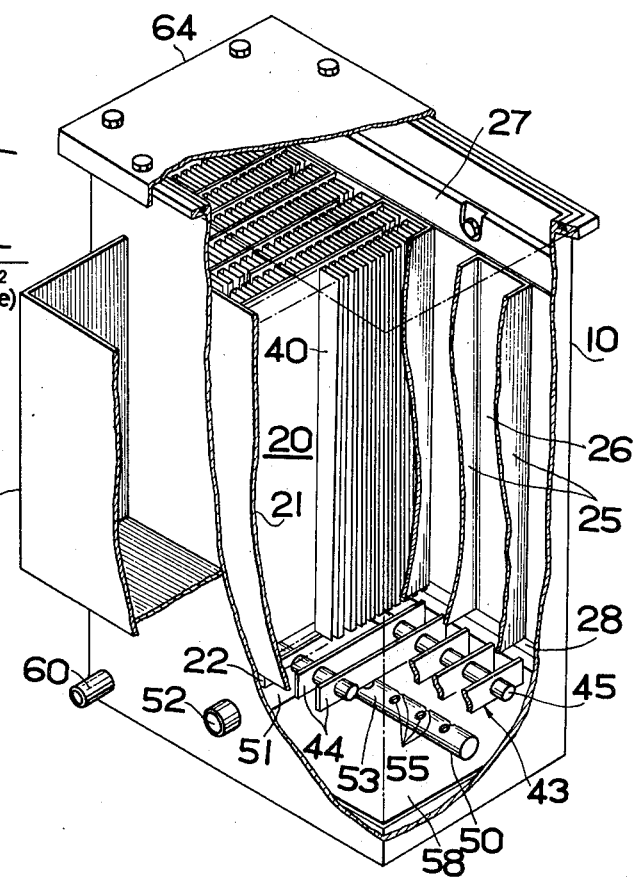

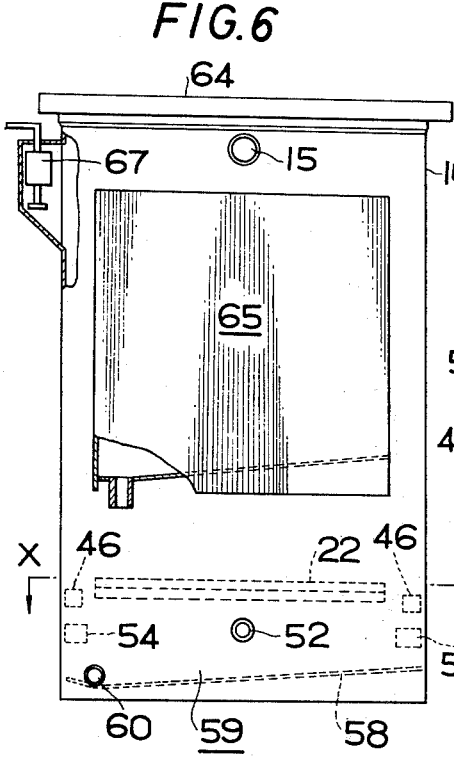
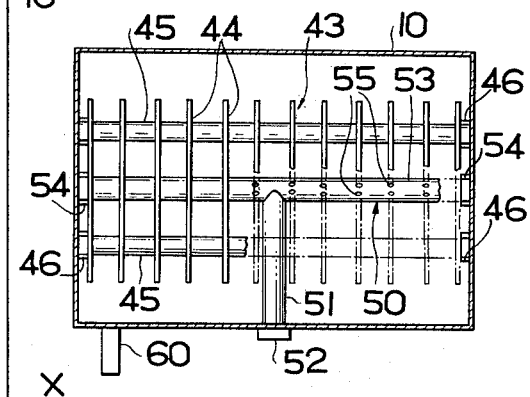
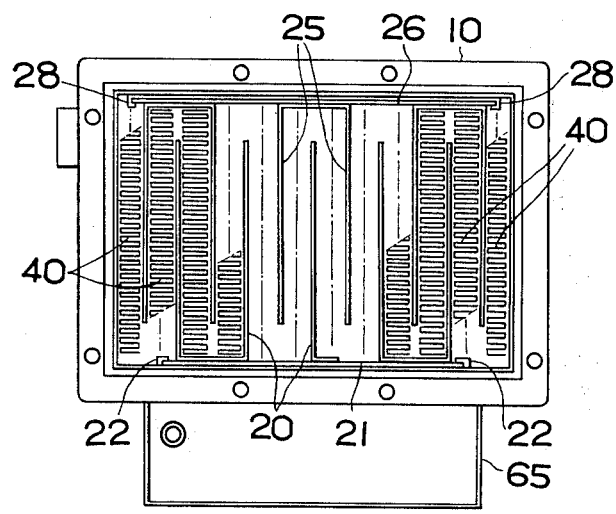

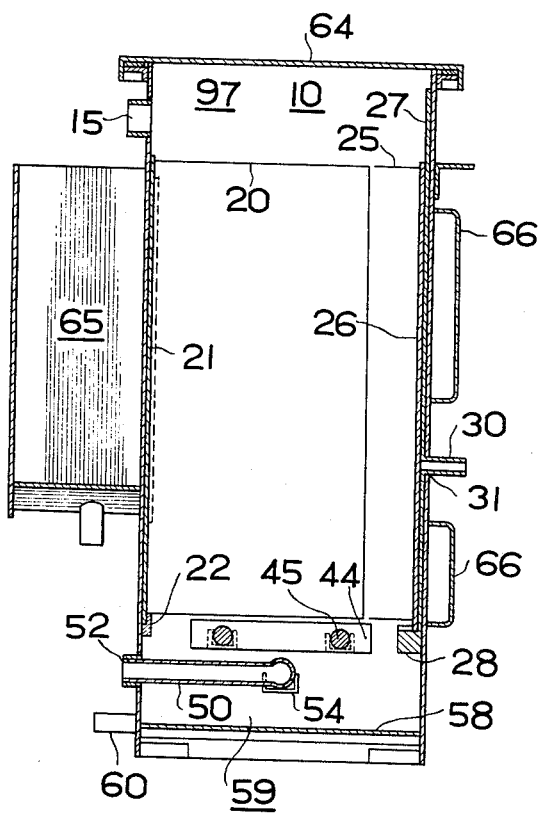
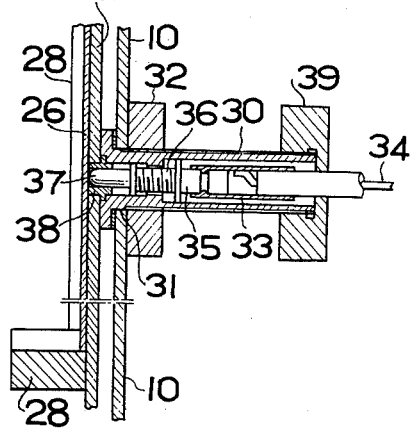
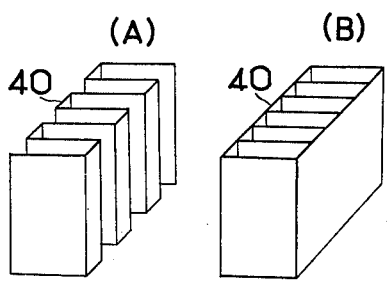

APPARATUS FOR ELECTROSTATICALLY PURIFYING NON-CONDUCTIVE LIQUID

FIELD OF THE INVENTION

This invention relates to a precipitator, and more particularly to an apparatus for removing fine particles of foreign materials suspended and dispersed in nonconductive liquid, such as oils, by the action of an electrostatic force.

BACKGROUND OF THE INVENTION

There has heretofore been known a method for electrostatically collecting fine particles contained in a nonconductive liquid by creating an electric field in the liquid, intensifying field distortion, and disposing dielectric particle collecting members between electrodes to which voltage is applied. However, in the conventional device, fine particles adhered to the dust collecting plates flow away due to violent convection produced in the liquid by the creation of the electric field, or force exerted on the fine particles by the convection exceeds the electrostatic attractive force between the fine particles and the dust collecting plate, and the fine particles are scattered and float without being adhered to the dust collecting plate.

The inventor has found that if particle collecting plates of fibrous materials, such as for example paper, are arranged so as to be in parallel with the direction of an electric field, influences by the convection are significantly reduced so that fine particles can be caught and collected with an extraordinarily high efficiency.

This invention has been made on the basis of the knowledge as stated above, and has for its object to provide purifying equipment capable of purifying a large quantity of liquid with high efficiency.

SUMMARY OF THE INVENTION

Briefly, the invention comprises a purifying tank formed of an electric conductor, an inner wall thereof being made partly of electrodes comprising anode and and cathode plates being confrontingly disposed within the tank. A conduit for introducing the liquid to-be-treated into the tank is disposed below lower edges of the electrode plates. Liquid dispersing apertures are provided at the upper surface of the conduit which corresponds to an area between adjacent electrode plates. A large number of porous, particle collecting members made of a fibrous substance are arranged between the corresponding electrode plates in a manner to be parallel with the direction of the applied electric field and in parallel with a flow of the liquid flowed from the conduit. A particle precipitation space is defined between the liquid conduit and the bottom of the tank, a liquid supply pipe communicating with the conduit, a liquid outlet pipe for flowing the treated liquid from the upper part of the tank to the exterior, and a drainage pipe for discharging the liquid accumulating in the precipitation space are provided.

BRIEF DESCRIPTION OF THE DRAWINGS

This invention will be further described in conjunction with the drawings, wherein:

FIG. 1 is a schematic view of particle collecting members in an apparatus according to this invention;

FIG. 2 is a schematic view of conventional dust collecting members;

FIG. 3 is a diagram showing particle collecting characteristics;

FIG. 4 is a side view showing a general arrangement of the apparatus according to this invention;

FIG. 5 is a perspective view of a purifying tank showing the internal construction thereof in a partially cut-away view for clarification;

FIG. 6 is a partially broken away front view of the purifying tank;

FIG. 7 is a plan view of the purifying tank with the corner removed;

FIG. 8 is a sectional view taken along line X—X of FIG. 6;

FIG. 9 is a vertical sectional view of the purifying tank;

FIG. 10 is an enlarged sectional view of a cathode connecting portion;

FIGS. 11A and 11B are structural views of particle collecting members;

DETAILED DESCRIPTION OF A PREFERRED EMBODIMENT

Figure 12:
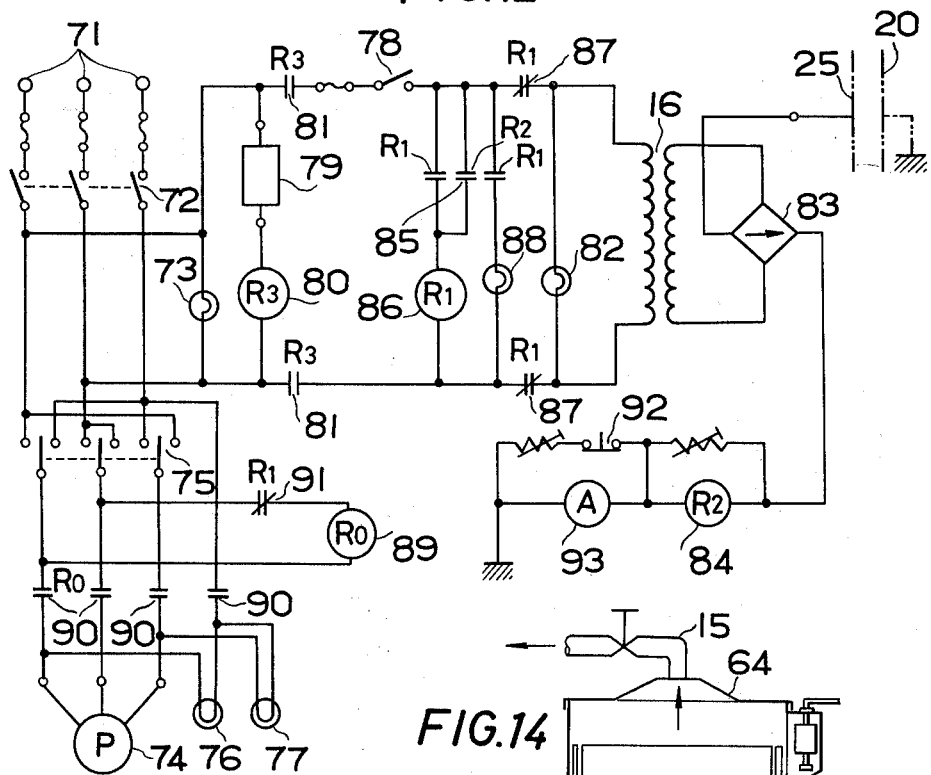
FIG. 12 is an electric circuit diagram of the invention.

With reference to FIGS. 1 to 3, FIG. 3 illustrates fine particle collecting characteristics in the cases where particle collecting plates 1 shown in FIGS. 1 and 2 are arranged in parallel with the direction of an electric field as shown in FIG. 1 and are arranged aslant as shown in FIG. 2 respectively. Curve A represents the former case, and curve B, the latter case. The distance between electrodes 2 and the pitch of the dust collecting plates are equal in both the cases.

FIG. 4 shows an embodiment in which a purifying tank 10 is installed on a truck 11. A supply pipe 12 for a liquid to-be-treated includes a trochoid pump 13 and a flow control valve 14. The supply pipe 12 communicates with a lower part of the purifying tank 10. The liquid after being purified and treated flows outside the tank 10 from an upper part thereof by means of a liquid delivery pipe 15. Further, power supply facilities 17 including a step-up transformer 16 are installed on the truck 11.

The internal structure of the purifying tank 10 is illustrated in FIG. 5. The tank 10 is made of a metallic rectangular parallelepiped container. On opposite inner wall surfaces, anode and cathode plates are confrontingly arranged. Numeral 20 designates the plurality of anode plates, which are arranged at equal intervals, and held by a back plate 21. Both side edges and a lower edge of the back plate 21 are detachably supported by a frame 22 fixed to the inner wall of the tank. Since the holding frame 22 is made of an electric conductor, the the anode plates 20 and the tank 10 are maintained electrically at the same potential. Thus, not only the electrode plates 20 but also the inner wall of the whole tank has the function of the anode plate. Usually, the anode is electrically maintained at the grounded potential.

Numeral 25 designates the plurality of cathode plates. In similar manner to the anode plates, the cathode plates are arranged at equal intervals and held by a back plate 26. As shown in FIG. 7, the anode plates 20 and the cathode plates 25 face each other alternately, in parallel and at equal distances apart. Between the cathode plates 25 and the inner wall of the tank, an insulating plate 27 is fixed to the tank wall. Both side edges and a lower edge of the cathode back plate 26 are detachably held by a frame 28 which is fixed to both side parts and a lower part of the insulating plate 27. The cathode plates 25 are electrically insulated from the tank 10 by the insulating plate 27.

A negative D.C. high voltage from the power source device 17 is applied to the cathode plates 25. A coupling means for the application of voltage is shown in FIG. 10 by way of example. In FIG. 10, numeral 30 designates a cylindrical member made of an insulating material, an outer peripheral surface of which is threaded. One end face of the cylindrical member is watertightly bonded to a rear surface of the insulating plate 27 for holding the cathode plates, while the other end face penetrates through a hole 31 provided in the tank wall and protrudes to the exterior. Numeral 32 refers to a clamping nut. Numeral 33 denotes a socket which is mounted on a fore end of an electric wire 34. Numeral 35 denotes a contact pin which is snugly fitted in the socket 33 and whose fore end is provided with a screw 36. The screw 36 is in threadable engagement with a female screw which is formed on an inner surface of the cylinder 30. Numeral 37 is a slide pin, which lies in contact with the fore end of the contact pin 35 and whose fore end penetrates through the insulating plate 27 and lies in contact with a rear surface of the cathode back plate 26. Numeral 38 indicates a bushing. Numeral 39 indicates a cap nut which is threadably secured to the extreme end of the cylinder.

When voltage is applied across the cathode and the anode, electric fields in which lines of electric force are at right angles with the electrode plates are respectively formed between the corresponding electrode plates and between the outermost cathode plate and the tank inner wall. Between the corresponding electrode plates and between the outermost cathode plate and the tank inner wall, large numbers of particle collecting members 40 are respectively arrayed at substantially equal intervals so as to be in parallel with the direction of the electric fields. The particle collecting member 40 is porous and is made of a fibrous substance, such as a natural fiber, synthetic fiber, or glass fiber having liquid permeability. The form of the particle collecting member 40 may be such that a large number of single plates having a predetermined width are supported by suitable holding means. However, it may be formed in such manner that a single flat plate is continuously bent into the shape of rectangular bellows as shown in FIG. 11A, or it may be formed in a shape of continuous boxes as shown in FIG. 11B. Obviously, the efficiency of collection of fine particles is increased when the pitch of the particle collecting members 40 is smaller, but it is usually from several mm to ten mm. The dielectric constant of the particle collecting member is determined by the property or dielectric constant of the fine particles to be collected and the dielectric constant of the liquid.

As shown in FIG. 8, the particle collecting members 40 are supported by a ladder-shaped member 43 which is disposed below the lower ends of the electrode plates. The supporting member 43 is composed of a plurality of shelf plates 44 made of an insulating material and a pair of coupling rods 45 supporting the shelf plates. Each shelf plate 44 is located almost in the middle between the adjacent electrode plates, and holds the lower edge of the dust collecting member. Both ends of each coupling rod 45 are held by brackets 46 which are fixed to the inner wall of the tank. The support for the particle collecting members is not restricted to the shelf plates 44, but the upper edge of the particle collecting member may be suspended and supported by a suitable member.

Disposed below the supporting member of the particle collector 43 is a T-shaped conduit 50 for conducting the liquid. The conduit 50 is made of an insulating material. A part 51 of the conduit 50 communicates with liquid supply pipes 52 and 12. A transverse part 53 of the conduit 50 is located almost in a center line of the tank 10, and is supported at its ends by brackets 54 fixed to the inner wall of the tank. Further, a plurality of liquid dispersing apertures 55 are provided in the upper surfae of the conduit 53. It is preferable that the liquid dispersing apertures 55 are located almost in the middle between the adjacent electrode plates so that the liquid spurted from the apertures 55 may ascend in the space between the electrode plates.

A suitable interspace 59 is provided between the conduit 50 and the bottom plate 58 of the tank as shown in FIG. 9. The bottom plate 58 inclines towards one side, and a discharge pipe 60 is provided at the lowest part of the bottom plate. Particles precipitate and accumulate in the interspace 59. Since the interspace for precipitating the particles is hardly influenced by the convection of the liquid, the particles after having precipitated do not rise up and scatter. Furthermore, since the tank bottom 58 functions as an anode plate, floating of the particles is electrostatically prevented. Accordingly, the particles after having precipitated can be efficiently discharged.

A liquid exit port 15 is provided for discharging the liquid after having been purified and treated and is located at the tank wall above the upper edges of the electrode plates. A cover 64 is provided at the upper edge of the tank, which is fixed watertightly. Numeral 65 designates a box for accomodating fixtures which is mounted on an outer wall of the tank if necessary, and numeral 66 designates a reinforcement (FIG. 4). There is provivded a level switch 67 having a float for detecting the liquid fed into the tank to be reached a predetermined position (FIG. 6).

Numeral 70 represents a power control panel, on which necessary electric components such as a power switch and various kinds of meters are disposed. Usually, the anode plates are grounded, while the minus voltage is applied to the cathode plates. An example of the power source device will be explained with reference to the wiring diagram shown in FIG. 12. Numeral 71 designates commercial A.C. power source terminals, and 72 power source switches, and 73 a power source lamp. Numeral 74 designates the motor of the trochoid pump 13, 75 designates normal - reverse rotation change-over switches for the motor 74, 76 is a normal rotation indicating lamp, and 77 represents a reverse rotation indicating lamp. Numeral 78 denotes a high voltage on-off switch and 79 is the level switch described above. When a predetermined amount of liquid has been supplied to the purifying tank, the level switch 79 is actuated to energize a relay 80. Then, a make contact 81 of the relay is closed and power is supplied to the primary side of the step-up transformer 16. Numeral 82 denotes a high voltage indicating lamp. The secondary side of the transformer 16 is connected through a rectifier 83 to the cathode plates. Numeral 84 is an overcurrent relay. When an abnormal current flows between the anode and the cathode, the overcurrent relay is actuated to close a make contact 85, and energize a relay 86, and open a break contact 87 of the relay 86 so as to disconnect the power supply to the transformer 16. Numeral 88 denotes an alarm indicating lamp. In this case, a relay 89 is deenergized, and as a result the motor 74 is stopped. Numeral 90 represents a make contact of the relay 89, while numeral 91 represents a break contact of the relay 86.

In the apparatus described above, when the liquid to be treated is supplied to the tank, and D.C. high voltage is applied between the electrode plates, the fine particles of foreign materials in the liquid are electrostatically attracted to the porous, particle collecting members 40. The fine particles floating in the vicinity of the particle collecting members are quickly collected. Also, the fine particles floating at a distance from the particle collecting members are carried to the vicinity of the particle collecting members by the convection of the liquid caused by the electric field, and are caught on the flat areas of the dust collecting members. In this manner, the fine particles of the foreign materials suspended in the liquid are removed almost completely, and the liquid is purified.

The value of the applied voltage is determined by the size of the fine particles, the content of water in the liquid, and the like. The smaller the particles, the higher the voltage.

When purifying the liquid, the liquid may be circulated, or may not be circulated. In the case where the liquid is not circulated, the liquid is fed from the supply pipe 12 into the tank, and the pump 13 is thereafter reversely rotated to remove the treated liquid to the exterior by way of the supply pipe 12. In this case, since the interspace 59 is defined between the liquid conduit 50 and the tank bottom, the particles accumulated in the bottom are not removed.

In the case where the liquid is circulated, the liquid is fed from the lower part of the tank into the liquid by the supply pipe 12, and the treated liquid is removed from the liquid delivery port 15 at the upper part of the tank. The flow velocity of the circulated liquid in the tank is about 1 – 10 mm/second. The dust collecting members and the electrode plates are disposed in parallel with the direction of the flow of liquid so that they do not prevent the flow of the liquid.

Figure 13:
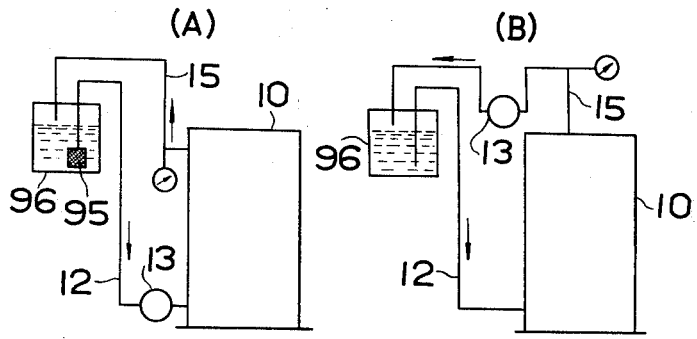
FIGS. 13A and 13B are diagrams for explaining liquid circulation.

There are two types of circulation of liquid according to the position of the pump. The type shown in FIG. 13A occurs when the pump 13 is arranged on the side of the liquid supply pipe. In this type, in order to prevent malfunction of the pump due to the particles in the liquid, it is necessary to fix a strainer 95 at the extreme end of the supply pipe. In consequence, the flow rate decreases because of the clogging of the strainer and the particles remain in supply tank 96. In addition, the pressure in the purifying tank rises, which requires that due consideration to sealing means and strengths be paid. The type shown in FIG. 13B occurs when the pump 13 is arranged on the side of the exit pipe 15. This type has the following advantages. It is unnecessary to mount a strainer at the extreme end of the supply pipe, and the particles are not left in the supply tank. Moreover, the pressure in the purifying tank does not become high. Even when sparks develop in the purifying tank on account of the electric discharge, arcing of the sparks to the supply tank 96 is checked by the pump 13.

Figure 14:
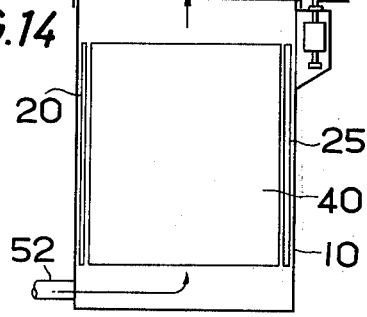
FIG. 14 is a schematic view of a liquid delivery pipe in another embodiment.

The exit pipe for removing the treating liquid may be provided at the side wall of the tank as stated above. However, in this case, since an air pocket 97 is formed at the upper part of the tank (FIG. 9), the occurrence of a fire due to the sparking by the electric discharge is possible, if the liquid to-be-treated is of high inflammability. In this case, the liquid delivery pipe 15 may be provided at an upper part of the cover 74 as shown in FIG. 14 so as to completely fill the interior of the tank with the liquid.

As described above, according to the apparatus of this invention, since the tank itself serves as part of the electrodes, the effective volume of the tank increases and large quantities of the liquid can be purified and treated with high efficiency. Since the apparatus is of the sealed type, handling is safe. Further, since the particle collecting members and the electrode plates are detachable, maintenance such as exchange and cleaning is very easy. Many such advantages are brought forth.

Use of the equipment is suitable mainly for the purifying treatment of fuel oil and machine lubricating oil. Especially, the equipment is most suitable for removing minute metal grains, such as aluminum grains, which can not be eliminated by a filter. However, it can be utilized also for any other treatment of an insulating liquid, for example, high-degree purification treatment of a solvent. The invention has very wide applictions, and plays a significant role in the prevention of environmental hazards and the conservation of resources.

I claim:

1. An apparatus for electrostatically purifying non-conductive liquids comprising:
   a tank;
   a plurality of anode and cathode plates disposed in an interleaved opposed relationship within said tank;
   a conduit for introducing liquid to be treated into said tank, said conduit being disposed below lower edges of said electrode plates and having apertures at the upper surface thereof for dispersing liquid between said electrodes;
   a plurality of particle collecting members made of porous dielectric fiber disposed between said electrode plates so as to be in parallel with the direction of the electric field created by said electrode plates and the flow of liquid spurted from said conduit, thereby defining a particle precipitation space between said conduit and the bottom of said tank;
   a liquid supply pipe communicating with said liquid conduit;
   a liquid outlet pipe for removing the treated liquid from the upper part of said tank to the exterior; and
   a drainage pipe for discharging the liquid remaining in said particle precipitation space.

2. An apparatus for electrostatically purifying non-conductive liquid as in claim 1, wherein said tank is made of a condutive material and the inner wall of said tank is electrically connected to one of said plurality of anode electrode plates so as to make said tank a part of said electrode and maintain said tank at a ground potential.

3. An apparatus for electrostatically purifying non-conductive liquid as in claim 1, wherein said liquid outlet pipe is provided at an upper part of the side wall of said tank.

4. An apparatus for electrostatically purifying non-conductive liquid as in claim 1, wherein said liquid outlet pipe is provided at an upper surface of the cover of said tank.

5. An apparatus for electrostatically purifying non-conductive liquid as in claim 1, further comprising a pump provided at said liquid supply pipe for supplying the liquid to be treated into said tank.

6. An apparatus for electrostatically purifying non-conductive liquid as in claim 1 further comprising a pump provided at said liquid outlet pipe for removing the treated liquid from said tank.

* * * * *